United States Patent [19]

Forster, Jr.

[11] 3,844,645

[45] Oct. 29, 1974

[54] THREE-DIMENSIONAL PROJECTION SYSTEM

[75] Inventor: Harry D. Forster, Jr., Miami Shores, Fla.

[73] Assignee: Holograph Corporation, East Hartford, Conn.

[22] Filed: July 7, 1972

[21] Appl. No.: 269,803

Related U.S. Application Data

[63] Continuation-in-part of Ser. No. 8,836, Feb. 5, 1970, abandoned.

[52] U.S. Cl. .................................... 353/10, 353/30

[51] Int. Cl. ........................................ G03b 21/00

[58] Field of Search .................. 353/10, 28, 30, 94; 350/3.5

[56] References Cited

UNITED STATES PATENTS

| | | | |
|---|---|---|---|
| 1,394,797 | 10/1971 | Smith | 353/10 |
| 3,006,241 | 10/1961 | Marks | 353/10 |
| 3,293,983 | 12/1966 | Gaudyn | 353/10 |
| 3,625,584 | 12/1971 | St. John | 350/3.5 |
| 3,639,032 | 2/1972 | Haines | 350/3.5 |

*Primary Examiner*—Samuel B. Rothberg
*Assistant Examiner*—A. J. Mirabito
*Attorney, Agent, or Firm*—Ostrolenk, Faber, Gerb & Soffen

[57] ABSTRACT

A three-dimensional projection system is provided by projecting a two-dimensional image upon a screen from a first image generating source and by additionally projecting from a second image generating source, an image suspended in space to a viewer with the latter image being created either by transmission through the screen or by reflection from the screen.

13 Claims, 5 Drawing Figures

INVENTOR.
HARRY D. FORSTER, JR.
BY
Ostrolenk, Faber, Gerb & Soffen
ATTORNEYS 3,844,645

INVENTOR.
HARRY D. FORSTER, JR.
BY
Ostrolenk, Faber, Gerb & Soffen
ATTORNEYS

THREE-DIMENSIONAL PROJECTION SYSTEM

This is a continuation-in-part of application Ser. No. 8,836, filed Feb. 5, 1970, now abandoned.

The present invention relates to three-dimensional projection systems, in general, and to such a system employing conventional two-dimensional projection techniques, in particular. As will become clear hereinafter, the two-dimensional projection system may incorporate conventional slide or move information to be combined with image information, as projected by holograms and the like.

Two distinct approaches for such three-dimensional projection systems are disclosed. In both approaches, a conventionally projected two-dimensional image is provided to be viewed as in a typical front projection system on a screen. In one arrangement, an additional image is viewed by transmission through the screen, while in the second arrangement, reflection of the teleoptic image suspended in space from the screen is employed. One particular feature of these approaches follows from the ability to utilize the established display technologies of slide and movie picture systems. That is, the usage of these well established techniques, in conjunction with the understood technology associated with holography, enables the provision of three-dimensional visual material in a simpler and less expensive manner than that associated with present three-dimensional systems, using polarized and non-polarized light techniques, color selectivity, etcetera.

While the projection system herein to be described can be utilized in three-dimensional movie systems, it is particularly attractive in environments where little motion is displayed, as an adjunct to advertising campaigns, especially in department stores, for example. This use of holography as an aid in providing a new advertising media is disclosed in my pending application Ser. No. 850,021, filed Aug. 14, 1969, now abandoned, and assigned to the same assignee as the instant application.

These and other features of the invention will be more fully understood from a consideration of the following description taken in connection with the drawings in which.

Figure 4:
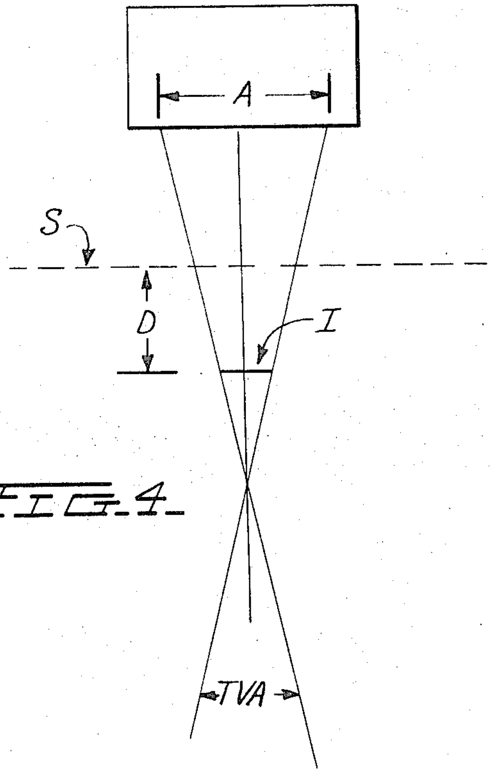
FIG. 4 is a diagrammatic plan view of the aerial image source useful in describing its operation.

FIG. 4 shows one preferred embodiment of the aerial image generating source of the instant invention. In this embodiment the aerial image generating (i.e. "teleoptic") source, TS, having an aperture of size A, projects an image of size I a distance DP, in front of aperture A. The light creating this image passes through a porous (i.e. light transmitting) screen S. The image is created in air a distance D in front of the screen S.

Experiments with such systems have shown that the aerial image I can appear to be either transparent or opaque. If the image I is much brighter than the image projected onto the screen S (for example, by the projector 10 of FIG. 1) then the observer will perceive I and not the image on S. This conveys to the observer the impression that the image I is opaque. If the intensity of I is reduced then the observer will be able to perceive the image on S as well as the image I. This causes the observer to perceive the image I as being transparent.

A further indication that the medium described by the present invention is different from other more conventional media is the fact that parallax can be observed between the image I and the screen S. As the observer moves about the image I can be made to obscure different portions of the image on S. This parallax is the same as would be observed between a real object of size I a distance D in front of screen S and images on the screen S.

Unlike a real object however, the image I will be seen only as long as it is backed up by the screen S. The primary requirement for the observation of the image I is that the observer look through the image I to the source. This requirement for observation means that we can describe a total viewing angle, TVA, as shown in FIG. 4. An observer located within this angle will be able to observe all of the image I. As the observer moves outside this angle he will lose the image. It can be shown by elementary geometry that the size of the viewing angle can be defined as:

$$\sin(TVA) = (A - I)/DP/1 + ((A-I)/DP)^2/4$$

This is exact only for the case of an image that is symmetric about the perpendicular bisector of the aperture A, however, it has been found that this equation can be used with reasonable accuracy for most practical applications. It is a simple matter for one trained in analysis to modify the above concept and equation to fit a particular need.

The above concept of a viewing angle coupled with the different but known characteristics of conventional projection systems creates a visual medium with unique viewing properties. These properties can be obtained by other embodiments as will be described below.

Figure 4A:
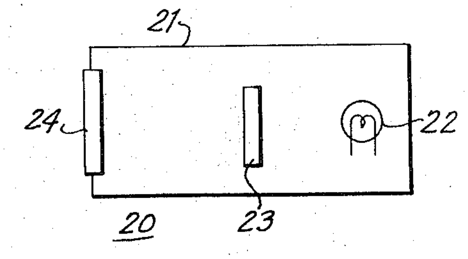
FIG. 4*a* is a detailed elevational view of the aerial image source of FIGS. 1–4.

The device 20 for generating the aerial image may, as shown in the preferred embodiment of FIG. 4*a*, be comprised of a housing 21 contianing a light source 22 coupled to a suitable power source (not shown for purposes of simplicity); a transparency 23 containing information to be projected; and a fresnel lens 24 which may be of the type shown and described in copending application Ser. No. 173,369, filed Aug. 20, 1971, and now U.S. Pat. No. 3,744,882 which is a continuation-in-part of application Ser. No. 884,786, filed Dec. 15, 1969, now abandoned.

Figure 1:
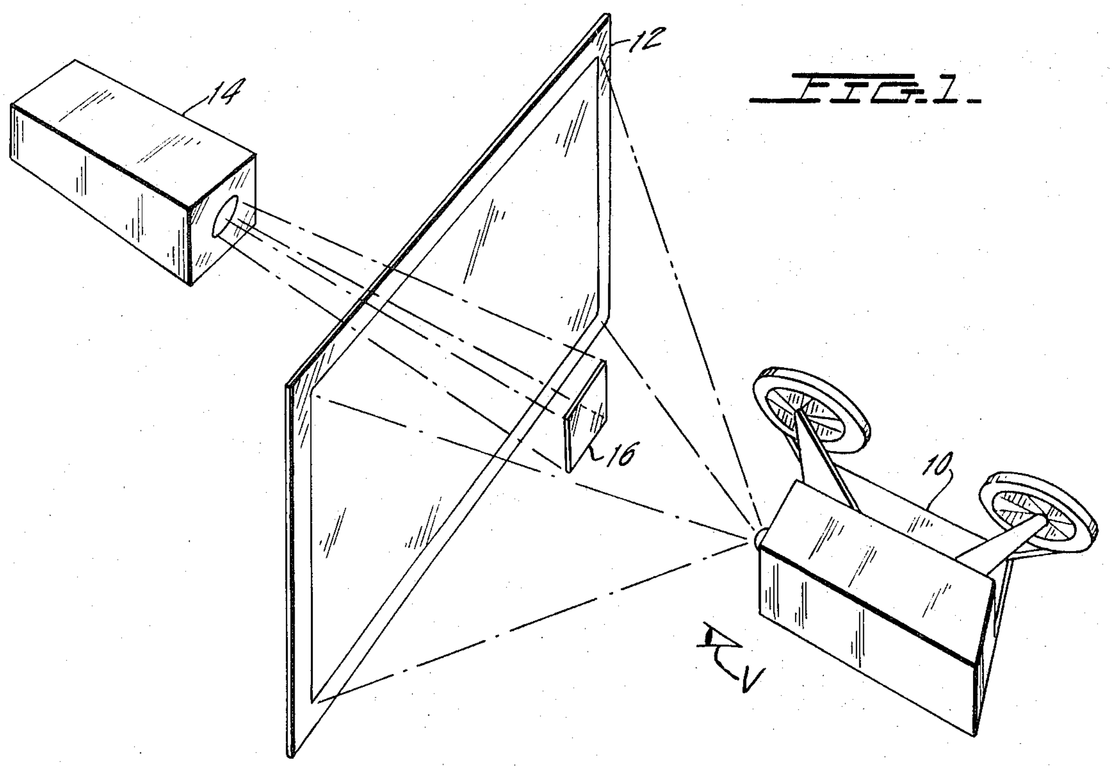
FIG. 1 shows an embodiment of the system in accordance with the invention in which an image transmitted through a projection screen and suspended in space is superimposed upon a second image projected upon the aforesaid screen.

Referring to FIG. 1, a typical two dimensional front projection system is shown represented by a 16 mm movie projector 10 and by a projection screen 12. It will be apparent that any type conventional projection system such as a 35 mm slide projector could alternatively be employed. An aerial image producing source 14 is shown located behind the screen 12 to direct the rays forming the image 16 toward the viewer V. Such a source may include a holographic display system, or a Fresnel lens arrangement or other similar such systems. As will be understood, the image projected through the screen may be located a predetermined distance relative to the screen 12, simply by changing the location of a fixed focal length source 14 relative to the screen 12, or by changing the focal length of a variable focal length source.

With the display from the conventional front projection system 10 being formed upon the viewing surface of the screen 12, and with the image 16 suspended in space being an "aerial" image appearing in space in front of the screen, a unique "three-dimensional" type presentation is created. The prominent features of the overall display can be highlighted to be either the image 16 or the conventional image through selection of the intensity of the source 14 relative to the front projector 10.

The critical element of the system of FIG. 1 has been found to be the choice for the screen 12. Experiments have been made and have pointed out the ability to utilize two different types of screen. In one arrangement, a half silvered mirror (one-way mirror) served as the screen 12, and permitted the image 16 to project through the mirror so as to be viewed by an observer positioned in front of the viewing surface. In this arrangement, as in the other, two dimensional image information can be projected onto the front surface of the mirror and be reflected to the observer. Obviously, the conventional projection system must be so positioned so that the mirror reflects only the image projected thereon, and not the projector system itself.

The second type of screen found to provide desired results is one which is of a "light porous" nature. Screens which may be utilized are a fine open weave mesh of sharp, non-fuzzy material to provide a structure in which the openings of the mesh screen are substantially uniformly distributed over the viewing surface to permit the light rays forming the image to substantially freely be transmitted therethrough and to appear to "hang in space." The material of the screen also provides a viewing surface for the front projector 10 to again insure that the overall display takes on the three-dimensional effect. As will be apparent, although the mesh screen tends to introduce a fine line structure in the suspended and reflective images, this structure is not objectionable if the mesh size is selected to be less than the desired resolution of the overall images.

One advantage of the overall system discussed above resides in the possibility of utilizing materials such as open weave curtains as part of the display system. These curtains could serve as the viewing screen 12 and can be utilized not only to obscure the image producing source 14, but to provide a "soft" surface as the background support for the system. Another advantage of such an arrangement resides in the ability to position the source 14 at a wide variety of locations behind the screen to make best use of the available space. Thus, with proper positioning of the source 14 the image could still be established at substantially the same place in front of the screen though the source be placed at floor level, at ceiling level, or at any location in between. This is particularly attractive in department store advertising, and is possible using the transmissive approach of the system of the invention.

Figure 3:
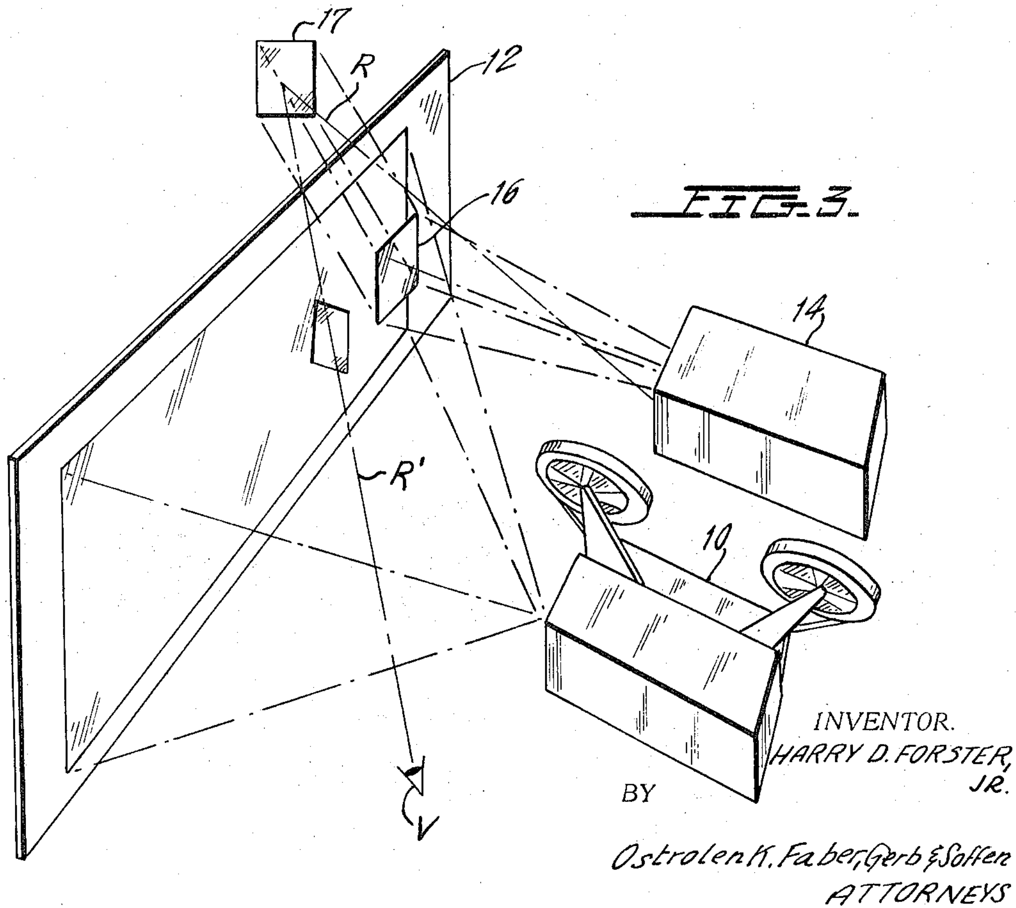
FIG. 3 is another embodiment of the invention wherein the image suspended in space is also viewed by reflection from the screen.
Figure 2:
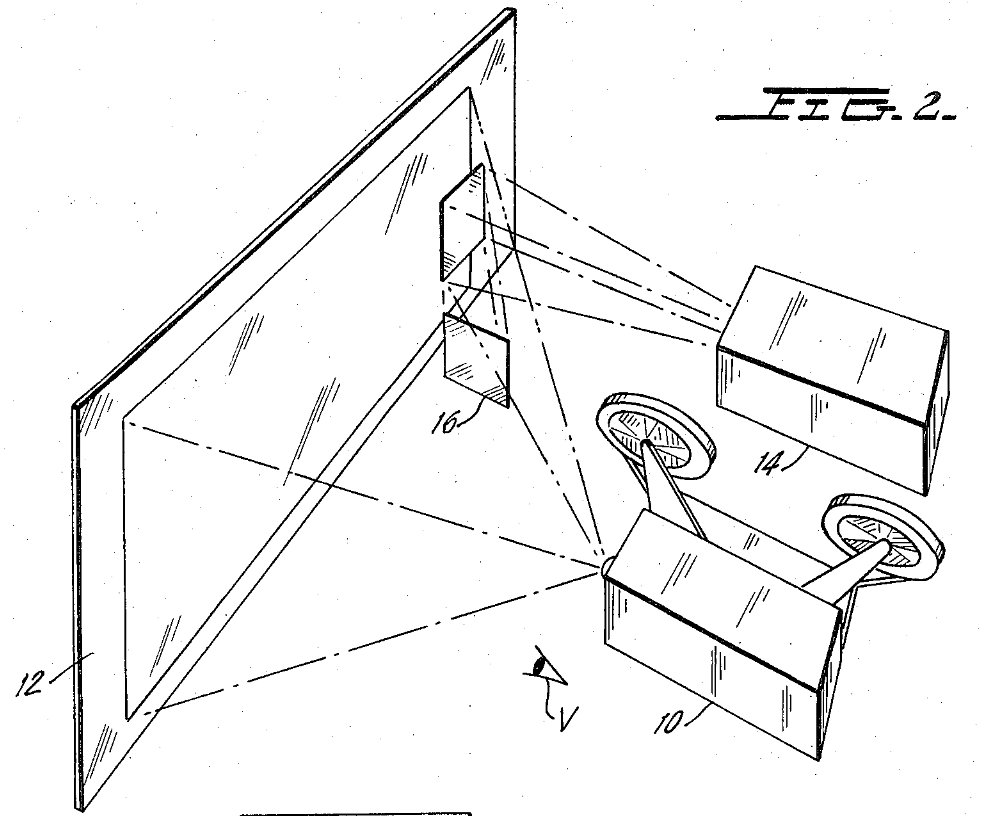
FIG. 2 is an embodiment of the invention wherein the image is viewed by reflection from the projection screen.

In the reflective type of system shown in FIGS. 2 and 3, both the conventional projector 10 and the source 14 are positioned in front of the screen 12. As in the system of FIG. 1, the two dimensional image from the unit 10 is projected onto the screen 12 and is reflected towards an observer. In the arrangement of FIG. 2, it will be understood that the source 14 is positioned with respect to the screen 12 such that the image it would tend to project would appear behind the screen 12 at a distance from the source which is greater than the distance from the source 14 to the screen 12. In this instance, the image suspended in space, however, will be reflected by the screen 12 and will be developed at a distance in front of the screen substantially equal to the distance that the image would appear behind the screen 12 were the screen not present in the light path. In other words, the screen 12 reflects the light waves of the source 14 so that the optical path length from the source 14 to the image remains substantially the same to the viewer V as if the screen 12 were not present.

In FIG. 3, on the other hand, the source 14 is positioned with respect to the screen 12 such that the "aerial" image from the source would tend to be developed between the source 14 and the screen 12. The image suspended in space in this environment will be seen by reflection from the screen 12 when the screen is in the form of a mirror. The apparent location of the reflected image would appear to the viewer V to be behind the screen, as a virtual image, the position of which is determined by the laws of reflection.

In all the above described arrangements, the background for the image suspended in space is that obtainable with the two-dimensional front projection system. In the simplest environment, the image suspended in space would be stationary, while the two-dimensional image could be either "still" or "moving."

However, present day techniques are also known to establish "moving" holograms and Fresnel displays, so that these, too, can be incorporated with the present invention; in such case, for ease of operation, the two-dimensional front projection image would then be the "still" image. Alternatively, it will be apparent that both the teleoptic image and two-dimensional image can be either "still" or "moving," and continue to provide the three-dimensional system of the invention.

Similarly, it will be noted that source 14 and a two-dimensional back-lighted projection system can be employed in a transmissive type of environment, as in FIG. 1. Here, both the source 14 and the two-dimensional projector 10 would be on the same side of the screen, with the screen being perforated or of mesh construction to permit transmission of the aerial image through the screen. As will be seen, this type of image will appear on the other side of the screen, and not between the screen and two-dimensional projector as in FIG. 1. The system of FIG. 1, furthermore, could be modified to replace the two-dimensional projector with a floodlight system or similar lighting arrangement, the effect of which would be to block from the viewer the presence of the teleoptic source behind the screen. The aerial image could continue to be seen, however, by proper choice of relative illuminations, and this arrangement is particularly attractive in advertising displays where a curtain is used on the screen.

Another alternative arrangement of the present invention is to provide a reflective mirror at position 17 shown in FIG. 3. The rays R forming the image developed by source 14 pass through open-weave screen 12, are reflected by the mirror at position 17 and again pass through screen 12 toward viewer V to create an aerial image at 16'. Depending upon the spacing between source 14 and the mirror at location 17, the image at 16′ can be formed either in front of or behind the viewing surface of screen 12.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A three-dimensional projection system comprising:

a screen;

first image generating means for projecting a two-dimensional image onto the surface of said screen for reflection therefrom to be viewed by an observer; and second image generating means for projecting an aerial image, said screen comprising means for passing the aerial image generated by said second means through said screen whereby the aerial image generated by said second means is directed toward said screen and suspended in space a spaced distance from the surface of said screen;

the aerial image projected by said second image generating means cooperating with said image provided by said two-dimensional projecting means, however, to establish an overall three-dimensional display having depth and exhibiting relative intensities between said two-dimensional image and said aerial image in accordance with their respective illuminations.

2. The three-dimensional projection system of claim 1 wherein said first image projecting means and said second image generating means are positioned on opposite sides of said screen and wherein said screen is constructed of an open-weave mesh to permit transmission of said aerial image therethrough to be produced a spaced distance from the viewing surface of said screen.

3. The three-dimensional projection system of claim 2 wherein said screen is of mesh construction having a substantially uniform distribution of openings in the viewing surface thereof for viewing the image provided by said two-dimensional projecting means and permitting the transmission of the rays forming said aerial image through the opening of said mesh.

4. The three-dimensional projection system of claim 1 wherein said first and second image generating means are positioned on the opposite sides of said screen and wherein said screen comprises a partially reflecting surface to reflect said aerial image to be developed in front of said screen.

5. The three-dimensional projection system of claim 4 wherein said first and second image generating means are positioned on opposite sides of said screen and wherein said screen is constructed to permit transmission of said aerial image therethrough to be developed in front of said screen, between said two-dimensional projecting means and the image on the screen formed thereby.

6. The three-dimensional projection system of claim 4 wherein said first and second image generating means are positioned on the same side of said screen and wherein said screen is constructed to reflect said second image to be developed in front of said screen, between said two-dimensional projecting means and the image on the screen formed thereby.

7. The three-dimensional projection system of claim 4 wherein the reflecting surface comprising a partially silvered mirror reflects the image provided by said two-dimensional projecting means and permitting transmission therethrough of said aerial image.

8. The three-dimensional projection system of claim 3 wherein said second means is positioned relative to said screen such that said aerial image tends to appear in back of said screen, and wherein said screen reflects the light waves forming the aerial image to create said aerial image in front of the two-dimensional projected image projected upon the viewing surface of the screen.

9. The three-dimensional projection system of claim 1 wherein a reflecting mirror is positioned behind said screen wherein the rays forming the aerial image developed by said second means is positioned to pass through said screen toward said mirror and are reflected thereby to pass through said screen such that the aerial image appears in front of said screen.

10. The three-dimensional projection system of claim 1 wherein said second means source comprises a holographic display generating means.

11. The three-dimensional projection system of claim 1 wherein said second means comprises a Fresnel lens, a light source directing light toward said lens and one or more transparencies positioned between said light source and said lens.

12. The three-dimensional projection system of claim 1 wherein said first and second image generating means are positioned on the same side of said screen and wherein said screen is constructed to permit transmission of said aerial image therethrough to be developed in front of said screen, in front of the two-dimensional image formed on said screen by said projecting means.

13. The three-dimensional projection system of claim 1, wherein said first and second image generating means are positioned on the same side of said screen, and wherein said screen is constructed to permit transmission of both of said images therethrough.

* * * * *